United States Patent
Serra et al.

(10) Patent No.: US 6,676,568 B2
(45) Date of Patent: *Jan. 13, 2004

(54) METHOD FOR RECLOSURE OF THE CLUTCH DURING A CHANGE OF GEAR

(75) Inventors: Gabriele Serra, S. Lazzaro di Savena (IT); Alessandro Palma, Ferrara (IT)

(73) Assignee: Magneti Marelli Powertrain, S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,761

(22) Filed: Oct. 25, 2001

(65) Prior Publication Data

US 2002/0077215 A1 Jun. 20, 2002

(30) Foreign Application Priority Data

Oct. 27, 2000 (IT) .................................. BO2000A0625

(51) Int. Cl.[7] .................. B60K 41/02; G06F 17/00; G06F 19/00; G06F 7/00
(52) U.S. Cl. ................. 477/180; 477/181; 477/174; 477/77; 701/67
(58) Field of Search ................... 477/175, 180, 477/181, 174, 70, 77, 83, 84, 90, 91; 701/67, 53, 54, 58, 61, 68

(56) References Cited

U.S. PATENT DOCUMENTS

| | | | | |
|---|---|---|---|---|
| 4,344,513 A | * | 8/1982 | Etienne | 701/67 |
| 5,206,805 A | * | 4/1993 | Petzold et al. | 701/67 |
| 5,407,401 A | * | 4/1995 | Bullmer et al. | 477/110 |
| 5,638,271 A | | 6/1997 | White et al. | 364/424.93 |
| 6,033,342 A | * | 3/2000 | Steinel et al. | 477/181 |
| 6,061,619 A | | 5/2000 | Schmitz et al. | 701/51 |
| 6,171,213 B1 | * | 1/2001 | Kosik et al. | 477/86 |
| 6,234,933 B1 | * | 5/2001 | Tornatore | 477/78 |
| 6,319,173 B1 | * | 11/2001 | Patel et al. | 477/180 |

FOREIGN PATENT DOCUMENTS

| | | |
|---|---|---|
| DE | 4204401 | 8/1993 |
| DE | 19725149 | 12/1997 |
| DE | 19712871 | 10/1998 |

* cited by examiner

*Primary Examiner*—Tisha D Lewis
(74) *Attorney, Agent, or Firm*—Hall, Priddy, Myers & Vande Sande

(57) ABSTRACT

Method for reclosure of the clutch during a change of gear, wherein the clutch is closed in order to adjust the angular speed of the drive shaft to match the angular speed of the primary shaft of the gearbox; the power supply to the engine is stopped, so as not to generate useful torque, the clutch is quickly disposed in a predetermined position, such as to transmit constant torque, which is substantially equal to the drive torque supplied by the engine immediately before the change of gear, and the clutch is kept in the predetermined position, until synchronization of the drive shaft and the primary shaft takes place.

42 Claims, 2 Drawing Sheets

# METHOD FOR RECLOSURE OF THE CLUTCH DURING A CHANGE OF GEAR

The present invention relates to a method for reclosure of the clutch during a change of gear, and in particular a change of gear carried out by a power-assisted control manual gearbox, to which the following description will refer specifically, without detracting from generality.

BACKGROUND OF THE INVENTION

Power-assisted control manual gearboxes are becoming increasingly common, which are structurally altogether similar to a manual gearbox of the conventional type, with the exception of the fact that pedals and control levers which can be actuated by the user are replaced by corresponding electric or hydraulic power-assisted controls. When using a power-assisted control manual gearbox, the user simply needs to transmit to a control system the order to change to a higher gear or a lower gear, and the control system automatically carries out the change of gear, by acting on the butterfly valve control and on the various power-assisted controls.

In normal driving conditions, a power-assisted control manual gearbox is required to guarantee a high level of comfort to the passengers of the vehicle during the phases of change of gear; recent studies have shown that in order to guarantee a high level of comfort for the passengers, the change of gear must take place within short times, and without giving rise to oscillations which can be perceived by the passengers themselves.

On completion of the operations of change of gear, the clutch must be reclosed, in order to render the drive shaft and the primary shaft of the gearbox integral with one another; in particular, after having established the new ratio in an ascending change (i.e. when the new ratio is "lengthier" than the preceding one), the vehicle proceeds at a speed which is virtually identical to the speed before the action of changing gear, the engine rotates at a speed which is substantially the same as that obtained for the vehicle by means of the preceding ratio, and the primary shaft of the gearbox rotates at a speed which is the same at that obtained for the vehicle by means of the new ratio, and thus rotates more slowly than the drive shaft.

In this situation, in order to reduce the change time to a minimum, the clutch should be closed in the shortest time possible; however, this operative method is acceptable only at the limit of sporting driving, since it induces a series of oscillations in the speed of travel of the vehicle, which can clearly be perceived by the passengers, with a consequent deterioration in running comfort.

In order to close the clutch on completion of the operations of change of gear, it is known to actuate progressively and simultaneously both the power-assisted control of the clutch, and the power-assisted control of the butterfly valve, such as to increase simultaneously and progressively both the torque transmitted by the clutch and the torque generated by the engine. However, it has been found that this methodology is capable of avoiding stresses which can be perceived by the passengers only if it is carried out within relatively lengthy times.

SUMMARY OF THE INVENTION

The object of the present invention is to provide a method for reclosure of the clutch during a change of gear, which is free from the disadvantages described, and which in particular is easy and economical to implement.

According to the present invention, a method is provided for reclosure of the clutch during a change of gear, as described in claim 1.

BRIEF DESCRIPTION OF THE DRAWINGS

The present invention will now be described with reference to the attached drawings, which illustrate a non-limiting embodiment of it, in which.

DETAILED DESCRIPTION OF THE INVENTION

Figure 1:
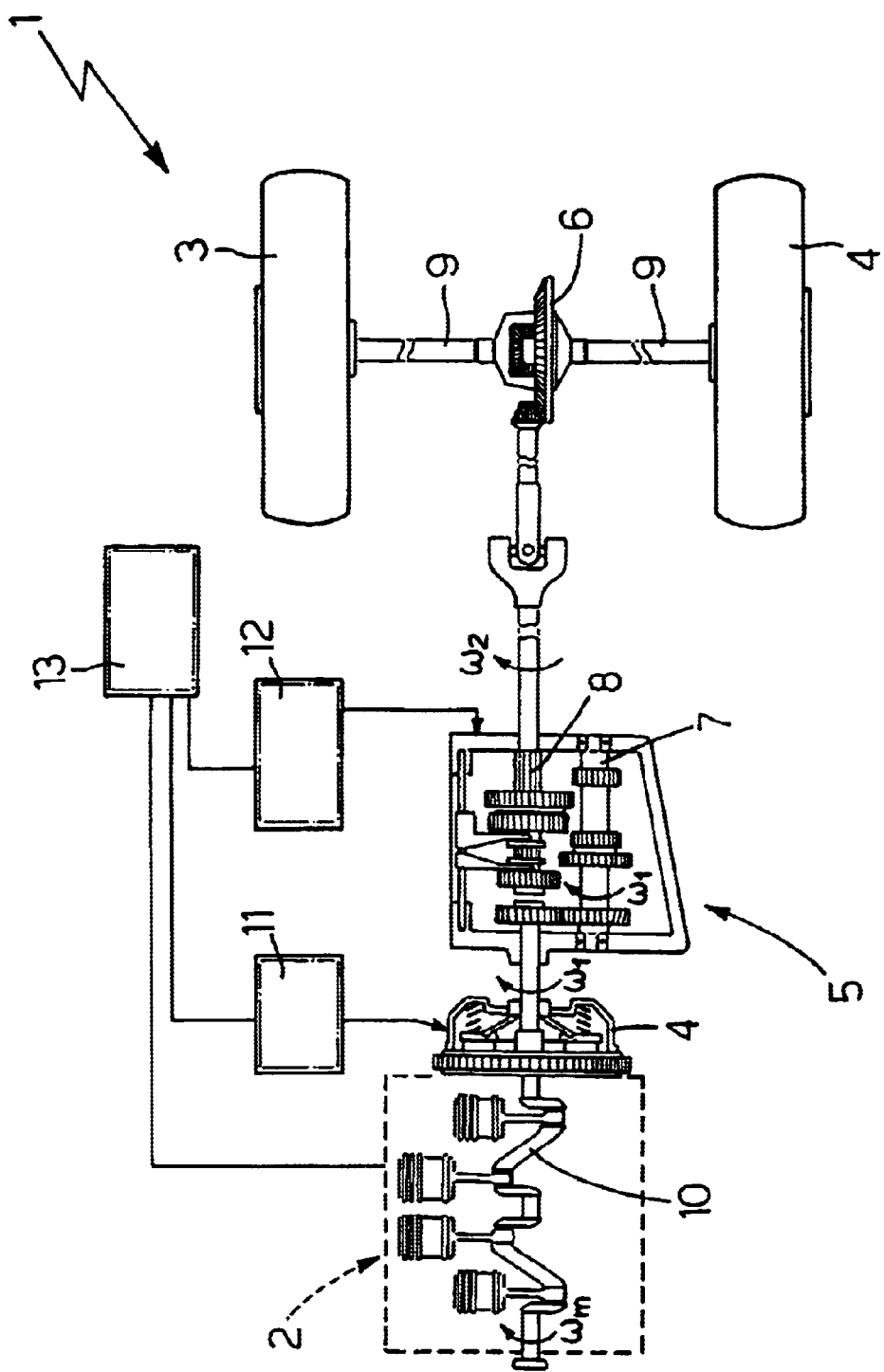
FIG. 1 is a schematic view of the engine and of the drive units of a vehicle provided with a power-assisted manual gearbox.

In FIG. 1, 1 indicates as a whole the drive units of a known vehicle, which can transmit the motion from an engine 2 to a pair of drive wheels 3. The drive units 1 comprise a clutch 4, a power-assisted control manual gearbox 5, and a differential 6; in turn, the gearbox 5 comprises a primary shaft 7, which rotates at an angular speed $\omega_1(t)$, and a secondary shaft 8, which rotates at an angular speed $\omega_2(t)$, and transmits the motion to the drive wheels 3 by means of the differential 6 and a pair of axle shafts 9. By means of interposition of the clutch 4, the primary shaft 7 is connected to a drive shaft 10, which is rotated by the engine 2, and rotates at an angular speed $\omega_m(t)$.

The drive units 1 are also provided with a hydraulic power-assisted control 11 of a known type, which can control the clutch 4, and a hydraulic power-assisted control 12 of a known type, which can control the position of the secondary shaft 8, in order to determine the drive ratio which exists between the primary shaft 7 and the secondary shaft 8. The power-assisted controls 11 and 12 are controlled by a control unit 13, which is connected to a series of sensors (which are known and are not illustrated), in order to detect the commands of the driver, and to measure the value of some reference quantities of the engine 2 and of the drive units 1.

In a corresponding memory (which is known and is not illustrated) in the control unit 13, there is stored the function $T_{cl}(x)$ of transmissivity of the clutch 4, which, for each position x of the clutch 4 (or rather for each position x of the disc thruster of the clutch 4) provides the torque $T_{cl}$ transmitted by means of the clutch 4 itself, from the drive shaft 10 to the primary shaft 7 of the gearbox 5. In general, the function $T_{cl}(x)$ of transmissivity of the clutch 4 can be obtained from the equation [0], in which F(x) is the force exerted by the disc thruster of the clutch, $\mu$ is the coefficient of friction between the discs of the clutch 4, and SIGN( ) is a binary sign function, and assumes the value ±1, depending on whether the angular speed $\omega_m(t)$ of the drive shaft 10 is greater or less than the angular speed $\omega_1(t)$ of the primary shaft 7.

$$T_{cl}(x) = F(x) * \mu * \mathrm{SIGN}(\omega_m(t) - \omega_1(t)) \qquad [0]$$

During a change of gear, from a current gear A to a subsequent, higher gear B (i.e. which has a lengthier transmission ratio), the control unit 13 commands the power-assisted controls 11 and 12, in order to carry out opening of the clutch 4, so as to release the gear A, to engage the gear B, and finally to close the clutch 4. During the above-described operations of change of gear, the control unit 13 keeps constantly under control the drive torque $T_m$ generated by the engine 2, in order to keep the angular speed $\omega_m(t)$ of the drive shaft 10 substantially equal to the required values.

During the phase of reclosure of the clutch 4, after the gear B has been engaged, the angular speed $\omega_m(t)$ of the drive shaft 10 is adjusted to match the angular speed $\omega_1(t)$ of the primary shaft 7, which angular speed $\omega_1(t)$ is set by the speed of the vehicle, since the primary shaft 7 is angularly integral with the drive wheels 3, by means of the axle shafts 9, the differential 6, the secondary shaft 8, and the gear train of the gear B. During the phase of reclosure of the clutch 4, the clutch 4 itself slides, and transmits torque $T_{cl}$ between the drive shaft 10 and the primary shaft 7; in this situation, the law of motion is provided by the equation [1], in which $J_m$ represents the moment of inertia of the engine 2, and $\omega'_m(t)$ represents the drift over a period of time of the angular speed $\omega_m(t)$ of the drive shaft 10, i.e. the angular acceleration of the drive shaft 10.

$$J_m * \omega'_m(t) = T_m(t) - T_{cl}(t). \quad [1]$$

Two other equations are derived directly from the equation [1]:

$$\omega'_m(t) = (T_m(t) - T_{cl}(t))/J_m \quad [2]$$

$$T_{cl}(t) = T_m(t) - J_m * \omega'_m(t) \quad [3]$$

In order to carry out relatively fast reclosure of the clutch 4, at the same time guaranteeing the comfort of the passengers, it is advantageous to regulate the engine 2 in order to prevent generation of useful torque (in fact, in these conditions, the engine generates drive torque $T_m$, which is slightly negative owing to the effect of the friction torques), and recloses the clutch 4 only partially, such as to make the clutch 4 itself transmit constant, predetermined torque $T_{cl}*$ to the primary shaft 7 of the gearbox, for an interval of time which is sufficient to use up the excess kinetic energy of the drive shaft 10, and to make the drive shaft 10 rotate substantially at an angular speed $\omega_m(t)$ which is equal to the angular speed $\omega_1(t)$ of the primary shaft 7. In fact, in these conditions, the engine 2 generates mechanical energy which is lower than that required for the traction, and is transmitted by the clutch 4, and the energy deficit is recuperated by discharging the kinetic energy possessed by the drive shaft 10, which slows down.

When the drive shaft 10 reaches an angular speed $\omega_m(t)$ which is close to the angular speed $\omega_1(t)$ of the primary shaft 7, the engine 2 is regulated in order progressively to restore generation of positive drive torque $T_m$; when the angular speed $\omega_m(t)$ of the drive shaft 10 is very close to, i.e. substantially the same as, the angular speed $\omega_1(t)$ of the primary shaft 7, the clutch 4 is fully closed, and the change of gear is consequently completed.

In other words, the method for closure of the clutch 4 consists of adjusting the clutch 4 rapidly to a predetermined position $x*$, in order to transmit constant torque $T_{cl}*$ (which is substantially equal to the drive torque $T*$ supplied by the engine 2 immediately before the change of gear), and to keep the clutch 4 in the predetermined position $x*$ until synchronization takes place between the drive shaft 10 and the primary shaft 7. In particular, the engine 2 is regulated in order to supply zero torque $T_m$ (or, more generally, torque which is lower than the torque $T_{cl}*$ transmitted by the clutch 4), until the angular speed $\omega_m(t)$ of the drive shaft 10 is close to the angular speed $\omega_1(t)$ of the primary shaft 7; at this point, the engine 2 is regulated in order to increase progressively the torque $T_m$ supplied, and the clutch 4 is reclosed fully, only when the angular speed $\omega_m(t)$ of the drive shaft is substantially equal (i.e. very close) to the angular speed $\omega_1(t)$ of the primary shaft (7).

In general, before the change of gear, the vehicle has acceleration $a*$ which is produced by a drive torque $T*$ supplied by the engine 2, by the effect of the driving actions of the driver; in addition, in order to guarantee maximum comfort, it is necessary for the operations of change of gear to cause the minimum disturbance to the travel of the vehicle. It is thus advantageous for the torque $T_{cl}*$ transmitted by the clutch 4 during the phase of slowing down of the drive shaft 10 to be substantially equal to the torque $T*$, in order to keep the law of motion of the vehicle unaltered, and to prevent causing disturbance to the passengers.

During the operations of change of gear, the control unit 13 determines the value of the drive torque $T*$ supplied by the engine 2 before the change of gear, and via the function $T_{cl}(x)$ of transmissivity of the clutch 4, determines the position $x*$ to which the clutch 4 itself (or rather the disc thruster of the clutch 4) must be adjusted, in order to transmit torque $T_{cl}*$ which is substantially equal to the torque $T*$ (minus the friction torques).

It is important to note that from the point of view of the drive wheels 3 (i.e. from the point of view of the vehicle) the operations of change of gear are concluded at the instant at which the clutch 4 has been adjusted to the position $x*$, in order to transmit the torque $T_{cl}*$, since from that instant onwards the drive wheels receive once again the torque $T*$ which they were receiving before the change of gear. This torque $T*$ is obviously supplied by the engine 2, and in an initial phase it is produced to the detriment of the kinetic energy of the drive shaft 10 (which consequently slows down in order to synchronize with the primary shaft 7), whereas in a subsequent phase, it is produced once again by the engine 2, by means of combustion of the fuel.

It is apparent from the foregoing description that traction is restored to the vehicle before the change of gear is completed definitively, with full reclosure of the clutch 4, since the drive wheels 3 receive full traction as soon as the phase of synchronization of the drive shaft 10 with the primary shaft 7 begins, since, already during this phase, the primary shaft 7 receives from the clutch 4 torque $T_{cl}*$ which is substantially equal to the torque $T*$ received before the change of gear. By this means, from the point of view of the vehicle, the actual duration of the change of gear is reduced, since the phase of zero traction torque is reduced.

Figure 2:
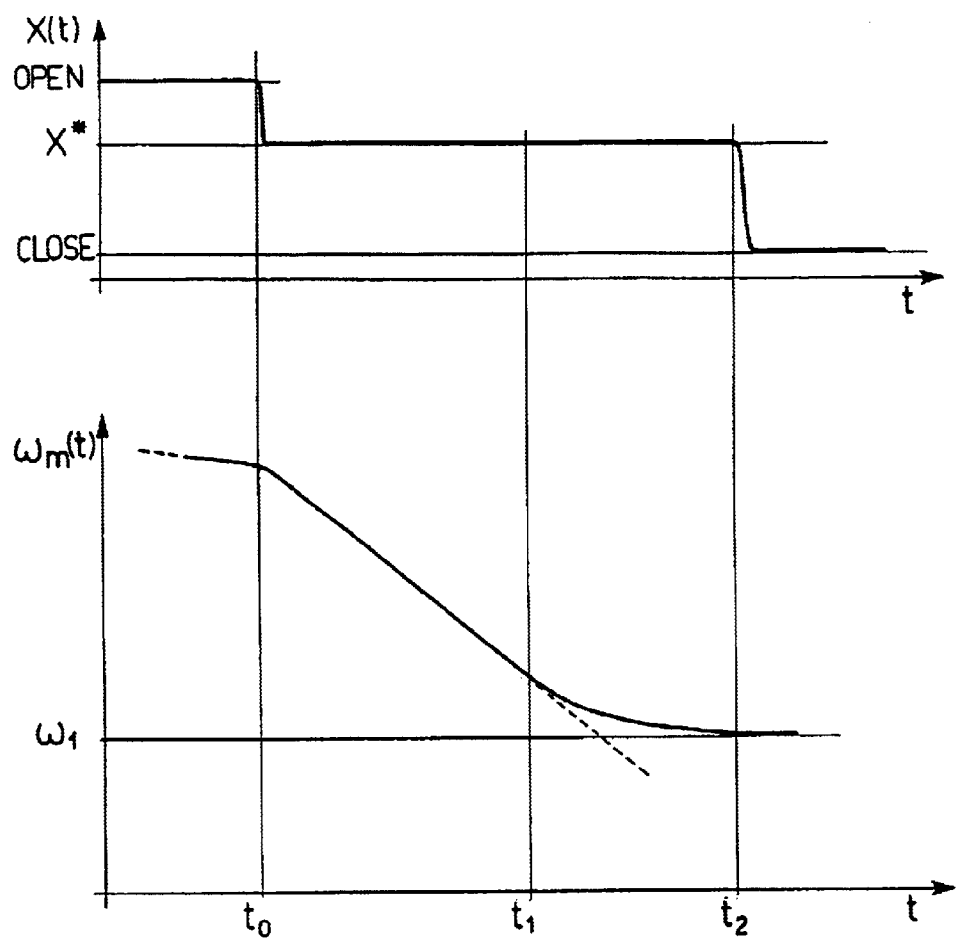
FIG. 2 illustrates the temporal development of some quantities during an operation of reclosure of the clutch, carried out according to the method which is the subject of the present invention.

FIG. 2 illustrates the temporal development of the position $x(t)$ of the clutch 4, and the temporal development of the angular speed $\omega_m(t)$ of the drive shaft 10, during the phase of reclosure of the clutch 4; in particular, engagement of the gear B is completed at an instant $t_0$, corresponding to which the clutch 4 is adjusted rapidly from a position of opening to a predetermined intermediate position, in order to transmit constant torque $T_{cl}*$ (substantially equal to the drive torque $T*$ supplied by the engine 2, immediately before the change of gear). The clutch 4 is kept in the predetermined position $x*$ until an instant $t_2$, in which synchronization of the drive shaft 10 and the primary shaft 7 is completed; at the instant $t_2$, the clutch is reclosed fully, and the change of gear is completed.

Between the instant $t_0$, at which the clutch 4 is adjusted rapidly from a position of full opening to the predetermined intermediate position $x*$, in order to transmit the constant torque $T_{cl}*$, and the instant $t_1$, at which the angular speed $\omega_m(t)$ of the drive shaft 10 is close to the angular speed $\omega_1(t)$ of the primary shaft 7 (i.e. between the two speeds $\omega_m(t)$ and $\omega_1(t)$, there is a difference of between 50 and 200 rpm), and the engine 2 is regulated by the control unit 13, in order to supply zero torque $T_m(t)$ (or, more generally, torque which is lower than the torque $T_{cl}^*$ transmitted by the clutch 4). Starting from the instant $t_1$, at which the angular speed $\omega_m(t)$ of the drive shaft 10 is close to the angular speed $\omega_1(t)$ of the primary shaft 7, the engine 2 is regulated by the control unit 13, in order to increase progressively the torque $T_m(t)$ supplied, such as to vary the angular speed $\omega_m(t)$ of the drive shaft 10 according to a law of motion of a parabolic type, which is substantially tangent to the angular speed $\omega_1(t)$ of the primary shaft 7 (angular speed $\omega_1(t)$ substantially constant in the interval of time considered).

From the foregoing information, it is apparent that the angular speed $\omega_m(t)$ of the drive shaft 10 before the instant $t_0$ has a drift $\omega'_m(t)$ over a period of time which is constant and slightly negative, as can be seen clearly from the equation [2], since the torque $T_{cl}(t)$ transmitted by the clutch 4 is zero, and the drive torque $T_m(t)$ generated by the engine 2 is slightly negative, owing to the effect of the friction torques (the power supply to the engine 2 is stopped, and the engine is not producing useful torque). Thus, the angular speed $\omega_m(t)$ of the drive shaft 10 before the instant $t_0$ has a linear law of motion, with a slightly negative gradient.

The angular speed $\omega_m(t)$ of the drive shaft 10 between the instant $t_0$ and the instant $t_1$ has a drift $\omega'_m(t)$ over a period of time which is constant and is strongly negative, as can be seen clearly from the equation [2], since the torque $T_{cl}(t)$ transmitted by the clutch 4 is constant, and is equal to the drive torque $T^*$ supplied by the engine 2, immediately before the change of gear, and the drive torque $T_m(t)$ generated by the engine 2 is slightly negative, owing to the effect of the friction torques (the power supply to the engine is stopped, and the engine is not producing useful torque). Thus, the angular speed $\omega_m(t)$ of the drive shaft 10 between the instant $t_0$ and the instant $t_1$ has a linear law of motion, with a pronounced negative gradient.

The angular speed $\omega_m(t)$ of the drive shaft 10 between the instant $t_1$ and the instant $t_2$ has a negative drift $\omega_m(t)$, and a modulus which decreases in a linear manner over a period of time, owing to the effect of the progressive increase of the drive torque $T_m(t)$ generated by the engine 2, under the control of the control unit 13. As a result of the equation [2], the torque $T_{cl}(t)$ transmitted by the clutch 4 is constant, and is equal to the drive torque $T^*$ supplied by the engine 2, immediately before the change of gear, and the drive torque $T_m(t)$ generated by the engine 2 increases in a linear manner, owing to the effect of the regulations applied by the control unit 13. Thus, the angular speed $\omega_m(t)$ of the drive shaft 10 between the instant $t_1$ and the instant $t_2$ has a parabolic law of motion; in fact, if the drift $\omega'_m(t)$ of the angular speed $\omega_m(t)$ has a linear increase over a period of time, the angular speed $\omega_m(t)$ has a law of motion of a parabolic type.

According to a different embodiment, the law of motion of the angular speed $\omega_m(t)$ need not be a law of a parabolic type. However, use of a law of a parabolic type is particularly advantageous, since the law of a parabolic type makes it possible to adjust the angular speed $\omega_m(t)$ until it is synchronized with the angular speed $\omega_1(t)$ in an extremely gentle and gradual manner, since the parabola of the angular speed $\omega_m(t)$ is designated such as to be substantially tangent to the straight line of the angular speed $\omega_1(t)$; in addition, the creation of a parabolic law of motion is relatively simple, since it requires the drift $\omega'_m(t)$ of the angular speed $\omega_m(t)$ to have an increase which is linear over a period of time, i.e. (on the basis of the equation [2]), it requires the drive torque $T_m(t)$ generated by the engine 2 to have an increase which is linear over a period of time.

Figure 3:
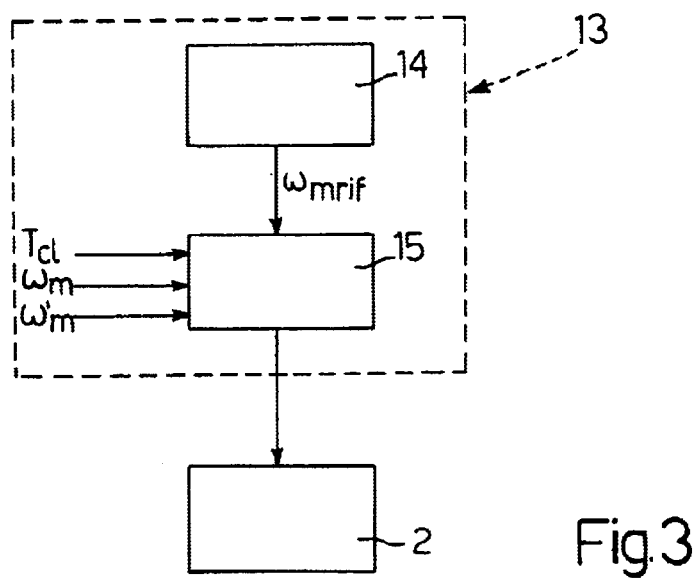
FIG. 3 illustrates a block diagram of part of a control unit in FIG. 1.

As illustrated in FIG. 3, the control unit 13 comprises a generation block 14, which, starting from the instant $t_1$, generates a reference signal $\omega_{mrif}(t)$, which indicates the ideal development which the angular speed $\omega_m(t)$ should assume between the instant $t_1$ and the instant $t_2$. The control unit 13 additionally comprises a piloting block 15, which receives as input the reference signal $\omega_{mrif}(t)$, the reading of the angular speed $\omega(t)$, the reading of the drift $\omega'_m(t)$ of the angular speed $\omega_m(t)$, and the reading of the torque $T_{cl}(t)$ transmitted by the clutch 4, and can pilot the engine 2 such as to make the angular speed $\omega_m(t)$ follow the development of the reference signal $\omega_{mrif}(t)$, within a predetermined tolerance.

The piloting block 15 controls the torque of the engine 2, i.e. it communicates to a control system (which is known and not illustrated) of the engine 2 the value of the objective torque $T_{mob}(t)$ which the engine 2 must supply, such that the angular speed $\omega_m(t)$ follows the development of the reference signal $\omega_{mrif}(t)$. The value of the objective torque $T_{mob}(t)$ is determined by the piloting block 15, by means of the sum of two contributions $T_{mob1}(t)$ and $T_{mob2}(t)$ which are independent from one another; the value $T_{mob1}(t)$ is determined by means of an open-loop control logic, on the basis of the torque $T_{cl}(t)$ transmitted by the clutch 4, whereas the value $T_{mob2}(t)$ is determined by means of a closed-loop logic, on the basis of the difference between the angular speed $\omega_m(t)$ and the reference signal $\omega_{mrif}(t)$. In greater detail, the value of the objective torque is determined by applying the equations [4], [5] and [6] listed below, in which K is the coefficient of gain, which depends on the operative condition.

$$T_{mob}(t) = T_{mob1}(t) + T_{mob2}(t) \tag{4}$$

$$T_{mob1}(t) = K^*(\omega_{mrif}(t) - \omega_m(t)) \tag{5}$$

$$T_{mob2}(t) = T_{cl}(t) + J_m^* \omega'_m(t) \tag{6}$$

By varying the value of the coefficient K of gain, and/or of the development of the reference signal $\omega_{mrif}(t)$, it is possible to vary both the duration of the interval of time which elapses between the instant $t_1$ and the instant $t_2$ (i.e. of the phase of resupply of torque on completion of the change of gear), and the gradient with which the angular speed $\omega_m(t)$ of the drive shaft 10 approaches the angular speed $\omega_1(t)$ of the primary shaft 7. It is important to note that the actual duration of the phase of resupply of torque substantially does not have any effect on the dynamic behavior of the vehicle, since the traction on the drive wheels 3 is already restored starting from the instant $t_1$, as previously described.

What is claimed is:

1. Method for reclosure of a clutch during a change of gear, wherein the clutch is closed in order to adjust an angular speed of a drive shaft of an engine to match an angular speed of a primary shaft of a gearbox; the method consists of adjusting the clutch to a predetermined position, in order to transmit constant torque, and to keep the clutch in the predetermined position until synchronization between the drive shaft and the primary shaft has taken place; a reference profile being generated for the angular speed of the drive shaft, and the engine being controlled in order to make the angular speed of the drive shaft follow the reference profile.

2. Method according to claim 1, wherein, in said predetermined position, the clutch transmits constant torque which is substantially equal to a drive torque supplied by the engine immediately before the change of gear.

3. Method according to claim 1, wherein said clutch is adjusted rapidly to said predetermined position.

4. Method according to claim 1, wherein the engine is regulated to supply a constant torque which is lower than the torque transmitted by the clutch, until the angular speed of the drive shaft is close to the angular speed of the primary shaft.

5. Method according to claim 4, wherein the power supply to said engine is stopped, so as not to generate useful torque until the angular speed of the drive shaft is close to the angular speed of the primary shaft.

6. Method according to claim 4, wherein said engine is regulated in order to increase the supplied torque progressively, when the angular speed of the drive shaft is close to the angular speed of the primary shaft.

7. Method according to claim 1, wherein said clutch is reclosed fully only when the angular speed of the drive shaft is substantially equal to the angular speed of the primary shaft.

8. Method according to claim 1, wherein said reference profile is generated when the angular speed of the drive shaft is close to the angular speed of the primary shaft of the gearbox.

9. Method according to claim 1, wherein said reference profile has a final portion which is substantially tangent to the angular speed of the primary shaft of the gearbox.

10. Method according to claim 9, wherein said reference profile has a final portion which is parabolic and is substantially tangent to the angular speed of the primary shaft of the gearbox.

11. Method according to claim 1, wherein the drive torque generated by the engine is controlled, in order to make the angular speed of the drive shaft follow the reference profile.

12. Method according to claim 11, wherein, in order to control the drive torque generated by the engine, a torque reference value is generated, to be requested from the engine itself.

13. Method according to claim 12, wherein said torque reference value comprises a first open-loop contribution, which is dependent on the torque transmitted by said clutch.

14. Method according to claim 13, wherein said first contribution is calculated as the sum of the torque transmitted by said clutch, and the product of a moment of inertia of the engine and an angular acceleration of the drive shaft.

15. Method according to claim 12, wherein said torque reference value comprises a second contribution in a closed loop, which is dependent on the difference between the angular speed of the drive shaft and the reference profile.

16. Method for reclosure of a clutch during a change of gear, wherein the clutch is closed in order to adjust an angular speed of a drive shaft of an engine to match an angular speed of a primary shaft of a gearbox; the method consists of adjusting the clutch to a predetermined position, in order to transmit constant torque, and to keep the clutch in the predetermined position until synchronization between the drive shaft and the primary shaft has taken place; the engine being regulated to supply a constant torque which is lower than the torque transmitted by the clutch, until the angular speed of the drive shaft is close to the angular speed of the primary shaft.

17. Method according to claim 16, wherein, in said predetermined position, the clutch transmits constant torque which is substantially equal to a drive torque supplied by the engine immediately before the change of gear.

18. Method according to claim 16, wherein said clutch is adjusted rapidly to the said predetermined position.

19. Method according to claim 16, wherein the power supply to said engine is stopped, so as not to generate useful torque until the angular speed of the drive shaft is close to the angular speed of the primary shaft.

20. Method according to claim 16, wherein said engine is regulated in order to increase the supplied torque progressively, when the angular speed of the drive shaft is close to the angular speed of the primary shaft.

21. Method according to claim 16, wherein said clutch is reclosed fully only when the angular speed of the drive shaft is substantially equal to the angular speed of the primary shaft.

22. Method according to claim 16, wherein a reference profile is generated for the angular speed of the drive shaft, and the engine is controlled in order to make the angular speed of the drive shaft follow the reference profile.

23. Method according to claim 22, wherein said reference profile is generated when the angular speed of the drive shaft is close to the angular speed of the primary shaft of the gearbox.

24. Method according to claim 22, wherein said reference profile has a final portion which is substantially tangent to the angular speed of the primary shaft of the gearbox.

25. Method according to claim 24, wherein said reference profile has a final portion which is parabolic and is substantially tangent to the angular speed of the primary shaft of the gearbox.

26. Method according to claim 22, wherein the drive torque generated by the engine is controlled, in order to make the angular speed of the drive shaft follow the reference profile.

27. Method according to claim 26, wherein, in order to control the drive torque generated by the engine, a torque reference value is generated, to be requested from the engine itself.

28. Method according to claim 27, wherein said torque reference value comprises a first open-loop contribution, which is dependent on the torque transmitted by said clutch.

29. Method according to claim 28, wherein said first contribution is calculated as the sum of the torque transmitted by said clutch, and the product of a moment of inertia of the engine and an angular acceleration of the drive shaft.

30. Method according to claim 27, wherein said torque reference value comprises a second contribution in a closed loop, which is dependent on the difference between the angular speed of the drive shaft and the reference profile.

31. Method for reclosure of a clutch during a change of gear, wherein the clutch is closed in order to adjust an angular speed of a drive shaft to match an angular speed of a primary shaft of a gearbox; the method consists of adjusting the clutch to a predetermined position, in order to transmit constant torque, and to keep the clutch in the predetermined position until synchronization between the drive shaft and the primary shaft has taken place; in said predetermined position, the clutch transmitting a constant torque which is substantially equal to a drive torque supplied by an engine immediately before the change of gear.

32. Method according to claim 31, wherein said clutch is adjusted rapidly to said predetermined position.

33. Method according to claim 31, wherein said clutch is reclosed fully only when the angular speed of the drive shaft is substantially equal to the angular speed of the primary shaft.

34. Method according to claim 31, wherein a reference profile is generated for the angular speed of the drive shaft, and the engine is controlled in order to make the angular speed of the drive shaft follow the reference profile.

35. Method according to claim 34, wherein said reference profile is generated when the angular speed of the drive shaft is close to the angular speed of the primary shaft of the gearbox.

36. Method according to claim 34, wherein said reference profile has a final portion which is substantially tangent to the angular speed of the primary shaft of the gearbox.

37. Method according to claim 36, wherein said reference profile has a final portion which is parabolic and is substantially tangent to the angular speed of the primary shaft of the gearbox.

38. Method according to claim 34, wherein the drive torque generated by the engine is controlled, in order to make the angular speed of the drive shaft follow the reference profile.

39. Method according to claim 38, wherein, in order to control the drive torque generated by the engine, a torque reference value is generated, to be requested from the engine itself.

40. Method according to claim 39, wherein said torque reference value comprises a first open-loop contribution, which is dependent on the torque transmitted by said clutch.

41. Method according to claim 40, wherein said first contribution is calculated as the sum of the torque transmitted by said clutch, and the product of a moment of inertia of the engine and an angular acceleration of the drive shaft.

42. Method according to claim 39, wherein said torque reference value comprises a second contribution in a closed loop, which is dependent on the difference between the angular speed of the drive shaft and the reference profile.

* * * * *